United States Patent Office 3,846,102
Patented Nov. 5, 1974

3,846,102
APPARATUS AND METHOD FOR THE MANUFACTURE OF FLOAT GLASS HAVING A THICKNESS GREATER THAN EQUILIBRIUM THICKNESS
Robert B. Heithoff, Cumberland, Md., assignor to PPG Industries, Inc., Pittsburgh, Pa.
Filed Apr. 17, 1973, Ser. No. 351,946
Int. Cl. C03b 18/02
U.S. Cl. 65—65 A
4 Claims

ABSTRACT OF THE DISCLOSURE

A float glass bath is provided with a cooled extension tile for each resistor. Each extension tile is provided with a cooling device for removing heat from the extreme marginal portions of a ribbon of glass being formed so that the glass will not flow back into the pockets which are provided between the restrictors and the walls of the float forming chamber.

BACKGROUND OF THE INVENTION

Field of the invention

This invention relates to an apparatus and method for manufacturing flat glass by floating molten glass on the surface of molten metal. More particularly, this invention relates to cooled extension tiles in combination with restrictors for confining molten glass on molten metal within a float forming chamber immediately after delivering the molten glass onto the molten metal.

Description of the prior art

Flat glass has long been manufactured by delivering molten glass onto a pool or bath of molten metal in an enclosed chamber, and cooling and attenuating the glass to form a continuous ribbon of flat glass. When molten glass is delivered onto molten metal it will naturally seek or assume equilibrium thickness on the molten metal. The equilibrium thickness for a typical soda-lime-silica glass is about 0.271 inch. In order to make flat glass that is thicker than equilibrium glass, it is necessary to hold the molten glass and prevent it from laterally spreading.

In the making of glass which is thicker than equilibrium thickness, it has been known to hold the molten glass on the molten metal between non-wettable tiles. According to the teachings of U.S. Pat. No. 3,266,880, non-wettable tiles may be provided on either side of a bath of molten metal to confine a layer of molten glass between them. The glass is cooled while passing between the non-wettable tiles and is withdrawn as a ribbon of flat glass from the molten metal.

Apparatus has been provided for initially restricting and then permitting the divergence of flow of glass during manufacture by the float process. Such apparatus is disclosed in U.S. Pat. No. 3,432,285 to Joseph A. Gulotta. That patent teaches the making of glass by delivering molten glass between diverging restrictors. These restrictors extend from a location near the upstream end of a float forming chamber where glass is delivered onto the molten metal downstream toward the exit end of the bath. These restrictors are preferably oriented to diverge from the entrance of the bath. Preferably, the restrictors taught in these references are individual elements extending into the float forming chamber, although the walls of the chamber itself might serve as restrictors.

In the preferred embodiment described in U.S. Pat. No. 3,432,285, the restrictors are constructed of conventional refractory material which is wettable by molten glass, and, at the downstream tip of each restrictor, there is provided a non-wettable insert, which is contacted by the molten glass immediately before the glass passes from between the restrictors. These tips are characterized as extension tiles and are preferably made of graphite.

In the making of thick glass on the order of at least three-quarter inch thickness, molten glass flows between the restrictors along the extension tile and outwardly along the downstream surfaces of the extension tile toward the side wall of the glass forming chamber. It will either flow outwardly until it contacts the walls or until it contacts fenders or other tile which further restrict its movement. The glass is sufficiently flowable when passing from between the diverging restrictors in conventional practice so that if it were not to contact fenders or the chamber side walls, it would laterally flow unhindered until it reached equilibrium thickness. Spaced between the diverging restrictors and the side walls or fenders there is an open space above the bath of molten metal. This open space has been called a pocket. In conventional practice, there is frequently encountered a problem of molten glass backing up into this pocket. That is, after leaving the confines of the diverging restrictors and their extension tiles, the molten glass flows to some extent back upstream into the pocket where it engages the side wall or oblique wall of a conventional float forming chamber. This results in glass sticking on these surfaces with some consequent devitrification. It also results in the inadvertent restraint of glass flow with consequent uneven tractive forces being applied to the glass during formation of a ribbon. Ultimately, this causes a substantial variation in the thickness of the ribbon of glass being formed. A variation of glass thickness across the width of the ribbon of glass being formed of as much as 0.050 inch is not uncommon in the making of thick glass of the order of three-fourths inch thickness. The variation in thickness across the width of the ribbon is such that the edges of the ribbon are thin and the center of the ribbon is thin, though usually not as thin as the edges or marginal portions. There are two regions of maximum thickness, one between the center of the ribbon and the left edge and one between the center of the ribbon and the right edge of the ribbon. Such a variation in glass thickness often makes the glass unacceptable for its intended use.

In the past, the problem of glass backing in the pocket has been solved by substantially decreasing the throughput of the process by slowing down the lehr rolls which pull the ribbon of glass from the float forming chamber and by decreasing the rate at which molten glass is fed onto the molten metal in the chamber. It has also been common to open the bath and, by using long hooks, to mechanically push the glass out of the pocket. The opening of the bath to insert hooks can frequently result in the inflow of ambient air which oxidizes the molten metal, usually tin, causing dross to form on both the interior surfaces of the float forming chamber and on the glass ribbon being formed.

The present invention provides an apparatus and a method for preventing glass from backing into the pockets of a float forming chamber while making thick glass.

SUMMARY OF THE INVENTION

This invention comprises an apparatus for manufacturing flat glass by the float method which has, in addition to those elements that are common in conventional forming chambers, extension tiles mounted on the ends of restrictors, which extension tiles are provided with cavities filled with fluid ballast and are further provided with means for extracting heat from this fluid ballast. The extension tiles employed in the present invention are shaped and weighted such that they maintain their alignment with respect to the restrictors and with respect to the float bath chambers to provide a consistent glass facing surface to the molten glass. They are provided with cavities which are at least partially filled with a fluid ballast. The fluid ballast may be a molten salt or a molten metal. It is, preferably, molten tin or a tin alloy identical to the molten metal used as the float bath. Extending into the molten metal in the cavity within the extension block is a cooling tube to extract heat from the molten metal which in turn will extract heat from the marginal portion of the glass in contact with the extension tile. It is not necessary to provide cooling for all cavities of an extension tile when an extension tile has several cavities. It is, however, preferred that the extreme downstream cavity of an extension tile be cooled since cooling of this cavity is most effective to cool the marginal portion of the glass in contact with the extension tile. The preferred extension tiles for use in this invention are those described and claimed in a copending applcation of Randal M. Smith, entitled "Float Glass Bath Having Submerged Extension Tiles," Ser. No. 351,927 which was filed on Apr. 17, 1973 and is commonly assigned. That related copending application is expressly incorporated by reference herein. As described in the copending application which is incorporated by reference here, the preferred extension tile has at least two cavities in it and is shaped to provide a substantially continuous glass facing surface when mounted in combination with a restrictor. When using this preferred extension tile, the cooling means which forms a part of this invention extends into the molten metal within the downstream cavity of the extension tile. The extension tile is retained in place against a restrictor and is prevented from being disloged or dragged downstream by mounting it on a strap or other retaining means, which is connected to a fixed support. This invention will be more fully understood from a description of drawings accompanying this disclosure.

DESCRIPTION OF THE PREFERRED EMBODIMENT

Figure 1:
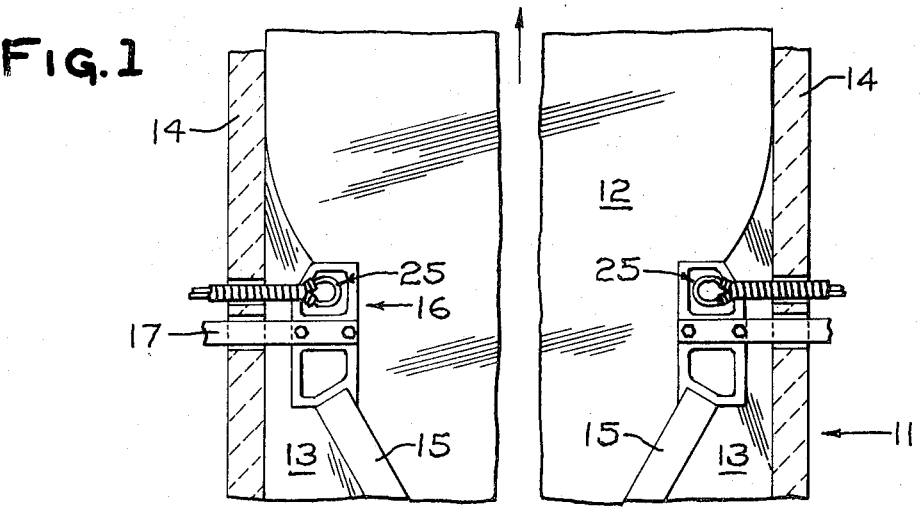
FIG. 1 is a schematic plan view of a portion of a float forming chamber according to this invention having therein cooled extension tiles according to the preferred embodiment of this invention.
Figure 2:
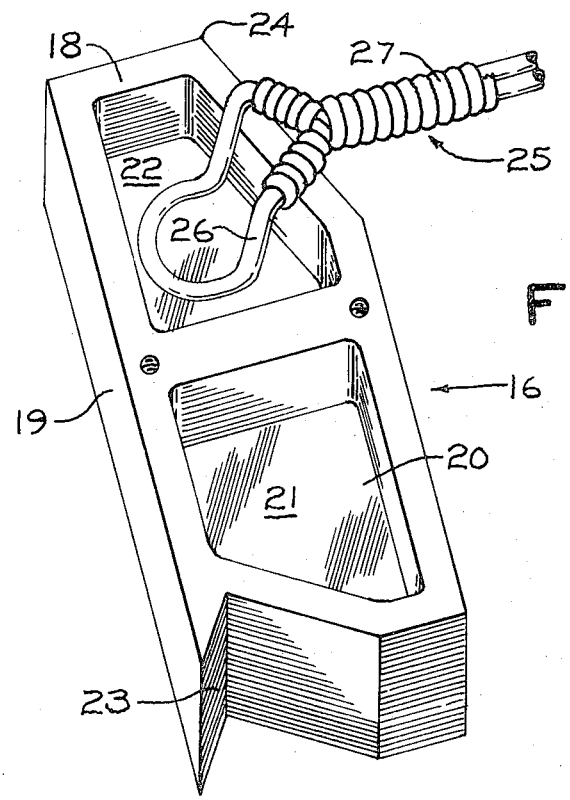
FIG. 2 is a detailed perspective view of a cooled extension tile employed in this invention corresponding to the extension tile shown in FIG. 1.
Figure 3:
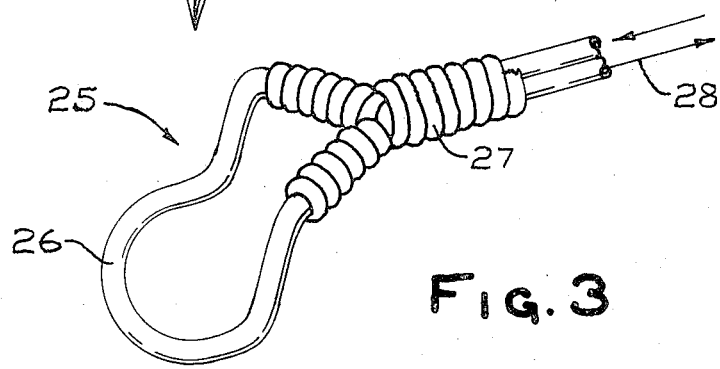
FIG. 3 is a detailed view of the preferred cooling means employed to cool the ballast in a cavity of the preferred extension tile employed in this invention.

Referring now particularly to FIG. 1, there is seen the apparatus comprising a preferred embodiment of this invention. A float chamber 11 is provided for receiving glass 12 in a molten state from a glass melting furnace (not shown). Within the float chamber 11 is a pool or bath of molten metal 13, preferably a tin or a tin alloy. Molten glass 12 is delivered onto the molten metal 13 on which it floats while being cooled and attenuated to form a dimensionally stable continuous ribbon of flat glass.

The float chamber 11 comprises side walls 14. As shown in FIG. 1 in the glass spreads to contact the side walls. In this embodiment of the invention, it is necessary to provide that the side walls, which are contacted by the glass, are sufficiently non-wettable by the glass so that the ribbon of glass will not stick to the side walls. Alternatively, the side walls 14 may be farther out from the center of the chamber and non-wettable fenders may be provided in the position where the side walls are shown in FIG. 1. Within the float chamber 11 are restrictors 15 which extend downstream from the feed end of the float forming chamber. The restrictors 15 may be substantially parallel, but are preferably diverging restrictors as shown. Between a restrictor 15 and its closest side wall 14 is a region known as a pocket.

At the end of each restrictor 15 there is an extension tile 16. The extension tile 16 is held in place by retaining means 17 which, in the preferred embodiment, is simply a strap to which the extension tile 16 is connected. The retaining means or strap 17 is mounted on a fixed mounting (not shown) which may be either a part of wall 14 or may be out by the float forming chamber 11. In the event the strap or retaining means 17 passes through a wall 14 of the chamber, the opening through which it passes will be sealed to prevent the loss of a protective reducing atmosphere, which is maintained within the float forming chamber 11. Considering the environment of the float forming chamber, the retaining strap 17 is preferably made of a stainless steel.

The extension tile 16 comprises substantially vertically oriented walls 18, one of which provides a glass facing surface 19. The extension tile 16 also has a bottom 20 so that the structure is a hollow body like a boat having cavities 21 and 22 therein. A portion of the wall 18 has a notch 23 or otherwise shaped portion for engaging the end of the restrictor 15. Extending into the downstream cavity 22 is a cooler 25. Cooler 25 comprises, in a preferred embodiment, tubing 26 which forms a loop extending down into the cavity. Surrounding the portion of the tubing 26 which is outside of the cavity 22 is thermal insulation which may be simply a wrapped insulation 27, such as asbestos rope.

During operation, molten glass 12 is delivered onto the surface of molten metal 13 between the restrictors 15. The molten glass flows downstream in the direction indicated by the arrow in FIG. 1. During its flow or movement downstream, the glass is cooled to form a ribbon of glass. At the downstream end of the float forming chamber 11, the ribbon of glass is removed from the molten metal by liftout rolls or other removal means. In the space above the molten metal and beneath the roof of the glass forming chamber, there is provided an inert atmosphere to prevent the oxidation of the molten metal. This atmosphere will preferably be substantially nitrogen with a small amount of hydrogen to scavenge any oxygen which may enter the chamber.

As the glass passes along between the restrictors, it is held in and prevented from spreading laterally under the influence of its own thickness and gravity. As the glass passes from between the extension tiles, it flows outwardly as well as moving downstream through the chamber. It flows outwardly until it contacts fenders or the side walls of the chamber. When glass substantially thicker than equilibrium thickness is being produced, the edges of the glass are sufficiently cooled as the glass passes the extension tile to cause a smooth outward and downstream movement of glass toward the fenders or walls as shown in FIG. 1. In conventional practice, the glass frequently flows rearwardly between the extension tile and the side wall and backs up into the pocket. In the practice of this invention, sufficient heat is removed from the edges of the glass flowing from between restrictors that rearward flow of glass is substantially eliminated in the vicinity of the ends of the restrictors. In the practice of this invention, the glass after flowing outwardly along the downstream face of the extension tile flows smoothly downstream and outwardly to a fender or wall without the detrimental rearward flow as encountered in the past.

The extent to which a marginal portion or edge of the glass is cooled is that cooling that is just sufficient to reduce the temperature of the edge of the glass to a temperature below that at which it would freely laterally flow under the influence of its own thickness and gravity to assume an equilibrium thickness. The cooling of the edges of the glass is accomplished by extracting heat from the molten metal in the downstream cavity of the extension tile. Coolant 28, preferably water, is circulated through the cooler 25. The coolant is continuously supplied at relatively low temperature, preferably about ambient room temperature, from a source of cooling water (not shown) and, after passing through the heater 25, is directed to a sink for the cooling water (not shown).

The tubing 26 which extends into the molten metal of the extension tile is made of a material which is not deteriorated through contact with the molten metal. A preferred material for the tubing is conventional No. 446 stainless steel. Other stainless steels, for example, No. 316 stainless steel, may be used in the alternative. The practice of the method of this invention will be further understood from the specific example which follows.

EXAMPLE

A continuous ribbon of flat glass is made according to this invention by supplying to the float forming chamber of this invention molten glass having the following approximate composition and percent by weight (analyzed): $SiO_2$, 73.22; $Na_2O$, 12.74; $K_2O$, 0.57; $CaO$, 8.81; $MgO$, 3.87; $Al_2O_3$, 1.03; $SO_3$, 0.18; and $Fe_2O_3$, 0.10.

Molten glass is supplied to the float forming chamber at a temperature of about 1980° F. at a rate sufficient to produce about 380 tons of glass per day. The glass is cooled while passing through the float forming chamber. It is withdrawn from the float chamber using conventional liftout rolls and is drawn through an annealing lehr before being cut into useful sizes. The take-out rolls and annealing lehr rolls are operated to provide sufficient tractive forces to the glass to produce a ribbon having a thickness of three-fourths inch.

Cooling water is supplied to each extension tile cooler at a rate of about 150 gallons per hour at an inlet temperature of about 70 to 80° F. Each cooler removes about 56,000 B.t.u.'s of heat per hour from its respective extension tile. The tin temperature in the extension tile cavity is maintained below about 1400° F. As the glass is produced, it flows between the restrictors and the extension tiles, then flows outwardly along the downstream face of the extension tile and then flows out against the retaining fenders. There is no observed tendency of the glass to back up into the pocket.

The ribbon of glass which is produced has a thickness of three-fourths inch and a width of 135 inches. The variation in thickness across the width of the ribbon of glass is less than plus or minus 0.005 inch.

While the invention described in the example above relates to the manufacture of a thick, flat glass having a particular composition, the apparatus and method of this invention may be employed to produce thick, flat glass of other compositions as well. Exemplary of a particular class of glasses which may be conveniently produced according to this invention are glasses having compositions within the following ranges in percent by weight: $SiO_2$, 70 to 73.3; $Na_2O$, 15.5 to 19.0; $CaO$, 5.5 to 7.7; $MgO$, 3.5 to 4.9; $Al_2O_3$, 0.1 to 1.5; $Fe_2O_3$, 0.03 to 0.7; $K_2O$, 0 to 0.5; and $SO_3$, 0 to 0.5. As will be evident to those skilled in the art of flat glass manufacture, other compositions may be employed in the practice of this invention as well. For example, in addition to lime-soda-silica glasses, glasses falling within the classes of borosilicate glasses and alumina silicate glasses may be produced according to this invention. The present description, which is limited to specific embodiments of this invention, is not intended to be exhaustive. It will be evident to those skilled in the art that the principles of this invention may be used to advantage while employing other specific glass compositions and other specific materials of construction.

What is claimed is:

1. In an apparatus for manufacturing flat glass by the float method comprising an enclosed chamber defined by a bottom, roof and walls, said chamber having a bottom portion containing a bath of molten metal and an upper portion for enclosing an inert atmosphere over said molten metal; having an upstream end for receiving molten glass onto said molten metal; having a downstream end containing means for removing a continuous ribbon of glass from said molten metal and having means therein for cooling and attenuating said molten glass to form said ribbon of glass while floating on said molten metal; wherein at its upstream end there is disposed a pair of restrictors in spaced relation, each extending downstream from the upstream end of said chamber, said pair, in combination, providing space for receiving said molten glass between them and for confining it between them on said molten metal while cooling it and drawing it along the surface of said molten metal; the improvement comprising, at the end of each restrictor, an extension tile comprising:
   (a) a hollow body extending downstream from each of said restrictors a distance such that molten glass flowing from between said tiles is sufficiently fluid to spread, partially submerged in said molten metal; said body having a first substantially vertical face aligned substantially parallel to the axis of general glass movement through said chamber and a second substantially vertical face forming a corner of said body and extending substantially perpendicular to said first face; said body having at least one cavity therein with an upwardly facing open portion;
   (b) fluid ballast at least partially filling said cavity; and
   (c) means for extracting heat from said fluid ballast.

2. The apparatus according to claim 1 wherein said fluid ballast is molten metal and said heat extraction means comprises a tubular cooling member extending through said molten metal ballast connected to a source of coolant and a sink for coolant, said tubular cooling member surrounded by thermal insulation in the vicinity of said cavity and in thermal contact with said molten metal ballast.

3. In a method for manufacturing flat glass by a float method comprising the steps of:
   (a) forming a pool of molten metal between opposing boundary walls and extending from an upstream region to a downstream region,
   (b) disposing in the upstream region of said pool of molten metal spaced opposing restrictors having opposing extension members at the downstream end thereof so as to provide opposing glass engaging surfaces,
   (c) depositing molten glass on said pool of molten metal in the upstream region thereof between said restrictors,
   (d) applying a force to said molten glass in the downstream direction of said pool of molten metal so as to cause the molten glass to flow (1) between said restrictors and the extensions thereof while in contact with said glass engaging surfaces thereof until said molten glass reaches the ends of said extension members and (2) both laterally toward the adjacent boundary wall of said pool of molten metal and in an upstream direction, the improvement comprising:
      cooling the said extension members adjacent the downstream portions thereof to a temperature sufficient to cool the edges of the molten glass in contact with the glass engaging surfaces of said extension members until the temperature of the edges of the molten glass are reduced to a temperature at which the movement of the edges of the glass is restricted to a lateral movement toward the adjacent boundary wall of said pool of molten glass.

4. The method according to claim 3 wherein said glass flowing from between said restrictors has a thickness greater than equilibrium thickness and said cooling is sufficient to cause the glass at its edges to be below a temperature at which it will freely laterally flow under the influence of having its thickness greater than equilibrium thickness.

References Cited
UNITED STATES PATENTS

| | | | |
|---|---|---|---|
| 3,468,653 | 9/1969 | Robinson et al. | 65—182 R X |
| 3,582,302 | 6/1971 | Kita et al. | 65—182 R X |

ARTHUR D. KELLOGG, Primary Examiner

U.S. Cl. X.R.

65—99 A, 182 R